United States Patent
Bai et al.

(10) Patent No.: US 12,361,569 B2
(45) Date of Patent: Jul. 15, 2025

(54) DEEP EQUILIBRIUM FLOW ESTIMATION

(71) Applicant: Robert Bosch GmbH, Stuttgart (DE)

(72) Inventors: Shaojie Bai, Pittsburgh, PA (US); Yash Savani, Pittsburgh, PA (US); Jeremy Kolter, Pittsburgh, PA (US); Devin T. Willmott, Pittsburgh, PA (US); João D. Semedo, Pittsburgh, PA (US); Filipe Condessa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 554 days.

(21) Appl. No.: 17/706,064

(22) Filed: Mar. 28, 2022

(65) Prior Publication Data

US 2023/0306617 A1 Sep. 28, 2023

(51) Int. Cl.
*G06T 7/269* (2017.01)

(52) U.S. Cl.
CPC .... *G06T 7/269* (2017.01); *G06T 2207/10016* (2013.01); *G06T 2207/20081* (2013.01); *G06T 2207/20084* (2013.01); *G06T 2207/30252* (2013.01)

(58) Field of Classification Search
CPC ........... G06T 7/269; G06T 2207/10016; G06T 2207/20081; G06T 2207/20084; G06T 2207/30252; G06T 2207/10024; G06T 2207/10048; G06V 10/82; G06N 3/08; G06N 20/00
See application file for complete search history.

(56) References Cited

U.S. PATENT DOCUMENTS

2021/0004589 A1* 1/2021 Turkelson ........ G06V 30/19173

OTHER PUBLICATIONS

Bai et al., Deep Equilibrium Models, 2019, Advances in Neural Information Processing Systems (NeurIPS), pp. 1-16 (Year: 2019).*
Bai, S. et al., "Deep Equilibrium Models," Advances in Neural Information Processing Systems (NeurIPS), 2019, pp. 1-16, https://arxiv.org/pdf/1909.01377.pdf.
Jiang, S. et al., "Learning to Estimate Hidden Motions with Global Motion Aggregation," Proceedings of the IEEE/CVF International Conference on Computer Vision (ICCV), 2021, 13 pages, https://arxiv.org/pdf/2104.02409.pdf.
Teed, Z. et al., "RAFT: Recurrent All-Pairs Field Transforms for Optical Flow," European Conference on Computer Vision, 2020, pp. 1-21, https://arxiv.org/pdf/2003.12039.pdf.

* cited by examiner

*Primary Examiner* — Nancy Bitar
(74) *Attorney, Agent, or Firm* — Brooks Kushman P.C.

(57) ABSTRACT

A computer-implemented method for a machine learning (ML) system includes receiving a first image frame and a second frame from a sensor, wherein the first and second image frames are time series data, determining a first flow state and a first latent state of the first image frame, determining a Deep Equilibrium Model (DEQ) based fix point solution via a root finding method based on the first flow state, the first latent state, and a layer function to obtain an estimated flow and latent state, receiving a third image frame, wherein the second and third image frames are time series data, determining the fix point solution via the root finding method based on the estimated flow state, the estimated latent state, and layer function to obtain an updated flow state and updated latent state, and outputting the updated flow state.

19 Claims, 12 Drawing Sheets

DEEP EQUILIBRIUM FLOW ESTIMATION

TECHNICAL FIELD

The present disclosure relates to flow estimation by computer systems that have capability for machine learning, including neural networks. In specific embodiments, this disclosure relates to a flow estimation via a deep equilibrium (DEQ) neural network model based fix point solution via a root finding method.

BACKGROUND

Neural networks are a subset of machine learning and are at the crux of deep learning algorithms. Neural networks include node layers containing an input layer, one or more hidden layers, and an output layer. Each node connects to another and has an associated weight and threshold. If the output of any individual node is above a threshold, that node is activated, sending data to the next layer of the network.

Recent developments have been made in implicit layers of neural networks. The basics of an implicit layer is that instead of specifying how to compute the layer's output from the input, one specifies the conditions that one wants the layer's output to satisfy.

One class of implicit layer models is a deep equilibrium (DEQ) model. DEQ modeling includes specifying a layer that finds the fixed point of some iterative procedure. A multiscale deep equilibrium model (MDEQ) directly solves for and backpropagates through the equilibrium points of multiple feature resolutions simultaneously, using implicit differentiation to avoid storing intermediate states.

SUMMARY

According to one embodiment, a computer-implemented method for a machine learning (ML) system includes receiving a first image frame and a second image frame from a sensor, wherein the first and second image frames are time series data, determining a first flow state and a first latent state of the first image frame, determining a Deep Equilibrium Model (DEQ) based fix point solution via a root finding method based on the first flow state, the first latent state, and a layer function to obtain an estimated flow state and an estimated latent state, receiving a third image frame, wherein the second and third image frames are time series data, determining the fix point solution via the root finding method based on the estimated flow state, the estimated latent state, and layer function to obtain an updated flow state and updated latent state, and outputting the updated flow state.

According to another embodiment, a system including a trainable function, includes an input interface for accessing input data for the trainable function and a processor in communication with the input interface. The processor is programmed to, receive a first image frame and a second image frame from a sensor electrically coupled with the input interface, wherein the first and second image frames are time series data, determine a first flow state and a first latent state of the first image frame, determine a fix point solution via a root finding method based on the first flow state, the first latent state, and a layer function to obtain an estimated flow state and an estimated latent state, receive a third image frame, wherein the second and third image frames are time series data, determine the fix point solution via the root finding method based on the estimated flow state, the estimated latent state, and layer function to obtain an updated flow state and updated latent state and control the system based on the updated flow state.

According to another embodiment, a non-transitory computer-readable medium includes instructions that, when executed by one or more computing devices, cause the one or more computing device to perform operations including to: receive a first image frame and a second image frame from a sensor, wherein the first and second image frames are time series data, determine a first flow state and a first latent state of the first image frame, determine a Deep Equilibrium Model (DEQ) based fix point solution via a root finding method based on the first flow state, the first latent state, and a layer function to obtain an estimated flow state and an estimated latent state, receive a third image frame, wherein the second and third image frames are time series data, determine the fix point solution via the root finding method based on the estimated flow state, the estimated latent state, and layer function to obtain an updated flow state and updated latent state, and output the updated flow state.

DETAILED DESCRIPTION

Figure 1:
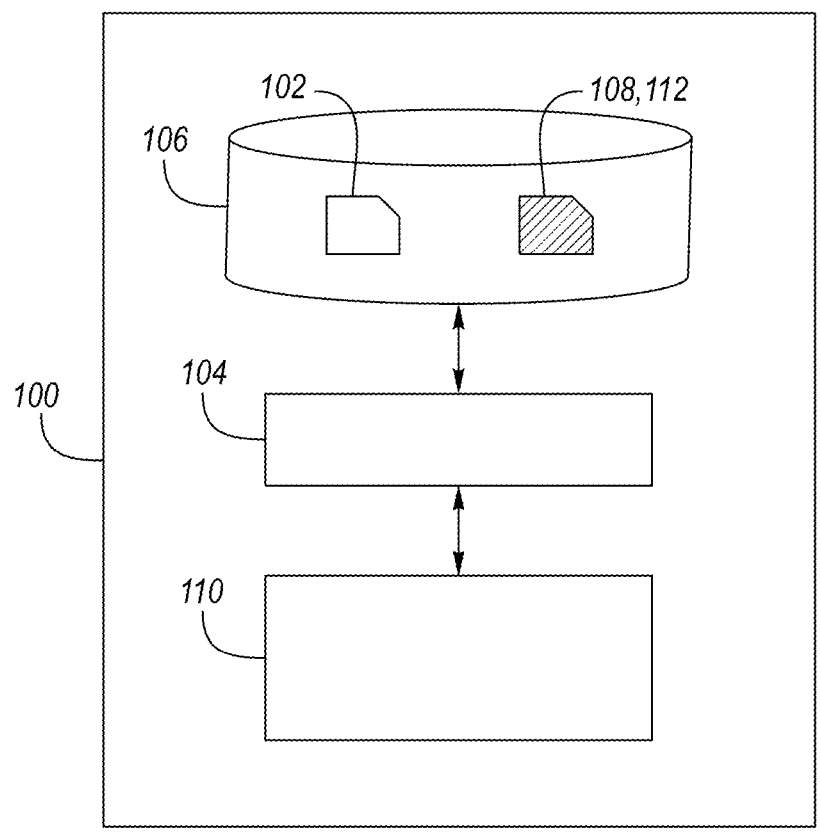
FIG. 1 illustrates a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque, LIDAR), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

Specifically, a sensor may measure properties of a time series signal and may include spatial or spatiotemporal aspects such as a location in space. The signal may include electromechanical, sound, light, electromagnetic, RF or other time series data. The technology disclosed in this application can be applied to time series imaging with other sensors, e.g., an antenna for wireless electromagnetic waves, microphone for sound, etc.

The term image refers to a representation or artifact that depicts perception of a physical characteristic (e.g., audible sound, visible light, Infrared light, ultrasound, underwater acoustics), such as a photograph or other two-dimensional picture, that resembles a subject (e.g., a physical object, scene, or property) and thus provides a depiction of it. An image may be multi-dimensional in that in may include components of time, space, intensity, concentration, or other characteristic. For example, an image may include a time series image. This technology can also be extended to image 3-D acoustic sources or objects.

The methods and systems described herein introduce a new solver for inference in deep equilibrium (DEQ) machine learning models, also referred to as DEQs. DEQs are a recent and very active area of research. This disclosure is an example of an implicit deep learning layer; instead of a layer as a simple function with an explicit expression that can be evaluated to receive the output, an implicit layer provides some analytical condition that the output of the layer must satisfy. DEQs have been shown to offer comparable performance to traditional network architectures while being significantly more memory-efficient. Unfortunately, this often comes at the cost of slower inference times, and past attempts to speed up inference in DEQs have done so at the cost of model accuracy (e.g., solver stopping early). Using the neural solver introduced in this disclosure, the inference speed can substantially increase with no real impact on the model's performance. Specifically, the solver disclosed herein uses a parameterized network to both guess an initial value of the optimization and perform iterative updates, in a method that generalizes a learnable form of Anderson acceleration and can be trained end-to-end. Such a solution is particularly well suited to the implicit model setting because inference in these models requires repeatedly solving for a fixed point of the same nonlinear layer for different inputs, which is performed well with the network described herein using the solver described herein.

Many recent state-of-the-art (SOTA) optical flow models use finite-step recurrent update operations to emulate traditional algorithms by encouraging iterative refinements toward a stable flow estimation. However, these RNNs impose large computation and memory overheads, and are not directly trained to model such "stable estimation", but instead use backpropagation-through-time (BPTT). These RNNs can converge poorly and thereby suffer from performance degradation. To combat these drawbacks, this application discloses a deep equilibrium (DEQ) flow estimators, an approach that directly solves for the flow as the fixed point of an implicit layer (e.g., via a black-box solver), and differentiates through this fixed point analytically, thus requiring O(1) training memory. This implicit-depth approach is not predicated on any specific model, and thus can be applied to a wide range of SOTA flow estimation model designs (e.g., recurrent all-pairs field transforms (RAFT) and global motion aggregation (GMA)). The use of these implicit DEQs allows us to compute the flow faster using, for example, fixed-point reuse and inexact gradients. This also consumes 4~6× less training memory than the recurrent counterpart and achieves better results with the same computation budget. In addition, this application discloses a sparse fixed-point correction scheme to stabilize a DEQ flow estimators, thereby addressing a longstanding challenge for DEQ models in general. These were verified on various realistic settings and show improvements on SOTA methods on Sintel and KITTI datasets with substantially better computational and memory efficiency.

Optical flow estimation is the classic computer vision task of predicting the apparent pixel-level motions between video frames. Learning-based approaches to this problem, which outperformed classical approaches, proposed the use of conventional deep convolutional networks to learn a flow estimate. Recent progress has shown that finite-step, unrolled and recurrent update operations significantly improve the estimation performance, exemplified by the emergence of the RAFT method. Contemporary optical flow models that employ this approach typically rely on a Gated Recurrent Unit (GRU) to iteratively refine the optical flow estimate. This approach was motivated to emulate traditional optimization-based methods, and the update operators defined accordingly have become the standard design for state-of-the-art flow models.

Despite superior performance, these rolled-out recurrent networks suffer from a few drawbacks. First, training these models involves tracking a long hidden-state history in the backpropagation-through-time (BPTT) algorithm, which yields a significant computational and memory burden. Therefore, these models tend to scale poorly with larger images and more iterations. Second, although these models were designed to emulate traditional optimization approaches which solve for a "stable estimate" with as many steps as needed, the recurrent networks do not directly model such a minimum-energy optima state. Rather, they stop after a predefined L update steps, and are still trained in a path dependent way using BPTT.

In this application, instead of stacking layers like in conventional networks, the DEQ models defines their outputs as the fixed points of a single layer $f_\theta$ using the input x; i.e., $z^*=f_\theta(z^*, x)$. Therefore, these networks (intuitively) model an "infinite-layer" equilibrium representation. Moreover, in the backward pass, these DEQ models can directly differentiate through the final fixed-point $z^*$ without having to store intermediary states during the forward computations. Thus, these implicit models can use a black-box, first-order solver for the forward pass that is free to take any path to the fixed point solution while only consuming O(1) memory during training. Note that this $f_\theta$ is not predicated on using any specific model design, and may apply the DEQ framework to large-scale tasks including language modeling and semantic segmentation while achieving results on par with Transformer models.

Here, a deep equilibrium (DEQ) flow estimators is presented as a superior and natural framework to replace the existing recurrent, unrolling-based flow estimation methods. There are multiple reasons why this approach is preferable. First, instead of relying on naïve iterative layer stacking, this can directly solve for the fixed point using specialized blackbox methods (e.g., quasi-Newton methods) in a spirit much more consistent with the traditional optimization-based perspective. Using this approach expedites the stable flow estimation process while often yielding better results. Second, this no longer needs to perform BPTT. Instead, this can directly differentiate through the fixed point $z^*$ itself, considerably lowering the training memory cost. Third, this fixed-point formulation justifies numerous implicit network enhancements such as 1) fixed-point reuse from adjacent video frames; and 2) inexact gradients. The former helps avoid redundant computations, thus substantially accelerating flow estimations; and the latter makes the backward pass computationally low. Fourth, the DEQ approach is not predicated on any specific structure for $f_\theta$. Therefore, the DEQ is a framework that applies to a wide range of these SOTA flow estimation model designs (e.g., RAFT, GMA, Depthstillation, etc.), and can obtain the aforementioned computational and memory benefits with even additional gain based on the specific structure of $f_\theta$.

In addition to suggesting DEQ flow estimators as a superior replacement to the existing recurrent approach, this also tackles the longstanding instability challenge of training DEQ networks. Inspired by the RAFT model, this sparse fixed-point correction scheme can substantially stabilizes DEQ flow estimators.

First, the deep equilibrium (DEQ) approach is a new natural starting point for formulating optical flow methods. A DEQ approach directly models and substantially accelerates the fixed-point convergence of the flow estimation process, avoids redundant computations across video frames, and comes with an almost-free backward pass. Second, the DEQ approach is orthogonal to, and thus compatible with, the prior modeling efforts (which focus on the model design and feature extraction) and data-related efforts. With DEQ, these prior model designs are now more computationally and memory efficient as well as more accurate. For instance, on KITTI-15 (train) a zero-shot DEQ-based RAFT model further reduces the state-of-the-art F1-all measure by 12.9% compared to using the same underlying RAFT model. Third, a sparse fixed-point correction scheme is presented that significantly stabilizes DEQ models on optical flow problems while only adding minimal cost and illustrate that flow estimation tasks using this approach is superior to the recently proposed Jacobian-based regularization.

Iterative Optical Flow: Although optical flow is a classical problem, there has recently been substantial progress in the area. Earlier methods formulated the optical flow prediction as an energy minimization problems using continuous optimization with different objective terms. This perspective inspired multiple improvements that used discrete optimization to model optical flows (e.g., those based on conditional random fields, global optimization, and inference on the global 4D cost volume). More recently, with the advancement of deep learning methods, there have been an explosion of efforts trying to emulate these optimization steps via deep neural networks. For example, there have been a number of optical flow methods based around deep architectures that rely on coarse-to-fine pyramids. Specifically, recent research efforts have turned to iterative refinements, which typically involves stacking multiple direct flow prediction modules. The RAFT model, which inspired this work, first showed they could achieve state-of-the-art performance on optical flow tasks using a correlation matrix and a convolutional GRU update operator that mimics the behavior of traditional optimizers, which tend to converge to a stable flow estimate. Built on top of this recurrent unrolling framework of RAFT, introduced an additional self-attention-like global motion aggregation (GMA) module prior to the recurrent stage to improve modeling of the occlusions. Another contemporary work, AutoFlow, exploits bilevel optimization to automatically render and augment training data for optical flow. Finally, by replacing the dense correlation volume with a sparse alternative these flow estimators may be quicker.

In a direction that is largely orthogonal to (and thus complementary to) these modeling efforts. The "default"

recurrent, unrolled formulation of training flow estimators themselves are improved. This maintains the same convergent flow estimation formulation while paying substantially less computation and memory cost.

Implicit deep learning: Considering a proposed a new class of deep learning architectures that do not have prescribed computation graphs or hierarchical layer stacking like conventional networks. Instead, the output of these implicit networks are typically defined to be the solution of an underlying dynamical system. For example, Neural ODEs model infinitesimal steps of a residual block as an ODE flow. A deep equilibrium (DEQ) network is another class of implicit model that directly solves for a fixed-point representation of a shallow layer $f_\theta$ (e.g., a Transformer block) and differentiates through this fixed point without storing intermediate steps in the forward pass. This allows one to train implicit networks with constant memory, while fully decoupling the forward and backward passes of training. However, it is known that these implicit models suffer from a few serious issues that have been studied by later works, such as computational inefficiency, instability, and lack of theoretical convergence guarantees. On a positive note, follow-up works have also shown that DEQ-based models can achieve competitive results on challenging tasks such as language modeling, generative modeling, semantic segmentation, etc. This application illustrates that this task could substantially benefit from the equilibrium model formulation as well.

Method: First start by introducing some modeling preliminaries of existing flow estimators. These modules are typically applied directly on raw image pairs, with the extracted representations then passed into the iterative refinement stage. Using the RAFT model as the illustrative example here while noting that cutting-edge flow estimators generally share similar structure (i.e., for context extraction and visual correlation computations).

Given an RGB image pair $p^1, p^2 \in R^{3 \times H \times W}$, an optical flow estimator aims to learn a correspondence $f \in R^{2 \times H \times W}$ between two coordinate grids $c^1, c^2$ (i.e., $f = c^2 - c^1$), which describes the per-pixel motion between consecutive frames in the horizontal (dx) and vertical (dy) directions. To process the matched image pair, this first encodes features $u^1, u^2 \in R^{C \times H \times w}$ of $p^1, p^2$, and produces a context embedding q from the first image $p^1$. Then, constructs a group of pyramid global correlation tensors $\mathcal{C} = \{\mathcal{C}^0, \ldots, \mathcal{C}^{P-1}\}$, where $C_k \in R_{H \times W \times H/2^k \times W/2^k}$ is found by first calculating the inner product between all pairs of hyperpixels in $u^1$ and $u^2$ as $C^0$, i.e., $$C^0_{ijmn} = \sum_d u^1_{ijd} u^2_{mnd} \quad (1)$$

followed by downsampling the last two dimensions to produce $C^k$ (k>0). The correlation pyramid C and context embedding q, which allow the model to infer large motions and displacements in a global sense, are then passed as inputs into the iterative refinement stage.

Here, the correlation and context computation part are kept intact (see FIG. 3A) and concentrate on the iterative refinement stage.

DEQ: A deep neural network may be defined with hidden layers z and activations f such that $z^{[i+1]} = f(z^{[i]}, \theta_i, c(x))$ for $i=0, 1, 2, \ldots, L$ with weights $\theta_i$ and previous layer inputs c(x) are both tied across layers, i.e., $\theta_i = \theta \forall i$. Some of these activations f may exhibit an attractor property, i.e., there exists a fixed point $z^*$ such that $z^* = f(z^*, \theta, c(x))$ and $$\lim_{L \to \infty} \underbrace{(f \circ \ldots \circ f)}_{L-times}(z^{[0]}, \theta, c(x)) = z^*,$$

i.e., the repeated application of f for an initial activation $z^{[0]}$ converges to a fixed point $z^*$. If this is the case, the iterated function application may be equivalently replaced by a numerical method to find the fixed-point directly. This shifts the problem from computing the forward and backward passes for multiple layers to computing and optimizing the fixed point directly via numerical methods. This approach may be referred to as a Deep Equilibrium Model (DEQ).

Regarding deep equilibrium models, given a layer/block $f_\theta$ (which may contain a few shallow sublayers) and an input x, a deep equilibrium model aims to approximate an "infinite-level" layer stacking of the form $z^{[i+1]} = f_\theta(z^{[i]}; x)$ (where $i=1; \ldots; L$, with $L \to \infty$) by directly solving for its fixed-point representation:

$$z^* = f_\theta(z^*; x)$$

One of the appealing properties of this fixed-point formulation is that one can implicitly differentiate through the equilibrium feature, without dependency on any intermediate activations in the forward pass. Formally, given a loss $\ell$, one can directly compute the gradient using the final output:

$$\frac{\partial \ell}{\partial (.)} = \frac{\partial \ell}{\partial z^*} (I - J_{f_\theta}(z^*))^{-1} \frac{\partial f_\theta(z^*; x)}{\partial (.)}$$

where $J_{f_\theta}(z^*)$ is the Jacobian matrix at equilibrium $z^*$. To solve for the equilibrium, Broyden's method may be used to find the root of $f_\theta(z^*; x) - z^* = 0$. Later works have applied other algorithms, such as Peaceman-Rachford splitting and Anderson acceleration.

DEQ Flow Estimator: Due to the inherent challenges of the flow estimation task, prior works have shown that explicit neural networks struggle to predict the flow accurately, requiring a prohibitively large number of training iterations. One solution is to resorted to mimicking the flavor of traditional optimization-based algorithms with RNNs (e.g., convGRUs). However, these methods are still quite different from the traditional methods in a few ways. For example, optimization-based methods 1) have an adaptive and well-defined stopping criteria (e.g., whenever they reach the optima); 2) are agnostic to the choice of solver (e.g., first- or second-order methods); and 3) are essentially path independent (i.e., the output alone is the only thing we should need). None of these properties are directly characterized by the finite-step unrolling of recurrent networks.

To close this gap a DEQ-based approach is disclosed. Specifically, given the context embedding q and the pyramid correlation tensor C, a DEQ flow estimator simultaneously solves for the fixed-point convergence of two streams: 1) a latent representation h, which constructs the flow updates; and 2) the flow estimate f itself, whose updates are generically related as follows:

$$h^{[i+1]} = \mathcal{H}(h^{[i]}, f^{[i]}, q, \mathcal{C}), \quad f^{[i+1]} = \mathcal{F}(h^{[i+1]}, f^{[i]}, q, \mathcal{C}), \quad (2)$$

This formulation captures the form of prominent flow estimator model designs like RAFT or GMA. Formally, the input x=(q,C) and model parameters $f_\theta = (H, F)$ jointly define a dynamical system that the DEQ flow model can directly solve the fixed-point for using the following flow update equation in its forward pass:

$$(h^*, f^*) = z^* = f_\theta(z^*, x) = f_\theta((h^*, f^*), x), \quad (3)$$

Intuitively, this corresponds to an "infinite-depth" feature representation z* where, if the system performs one more flow update step $f_\theta$, both flow estimation f and latent state h will not change (thus reaching a fixed point, i.e., an "equilibrium"). Importantly, by leveraging much more advanced root solving methods like quasi-Newton methods (e.g., Broyden's method or Anderson mixing) to find the fixed point. These methods guarantee a much faster (super-linear) and better-quality convergence than if performed infinitely many naïve unrolling steps (as do recurrent networks, but only up to a finite number of steps due to computation and memory constraints). Moreover, note that work on implicit networks have shown that the exact structure of $f_\theta$ subsumes a wide variety of model designs, such as a Transformer block, a residual block, or a graph layer. Similarly, for the deep equilibrium flow estimator, Eq. (2) engulfs optical flow models. For example, for RAFT, $$x = Conv2d([q, f^*, \mathcal{C}(f^* + c^0)]) \quad h^* = ConvGRU(h^*, [x, q])$$
$$f^* = f^* + Conv2d(h^*), \quad (4)$$

where $\mathcal{C}(f^* + c^0)$ stands for the correlation lookup as in RAFT. Note that GMA can be written in a similar update form.

A key question is then how to update and train a DEQ flow estimator. It turns out that one can directly differentiate through the fixed point flow state, (h*, f*) without any knowledge of the forward fixed-point trajectory:

Theorem 1. (Implicit Function Theorem (IFT)) Given the fixed-point flow representation z*=(h*, f*), the corresponding flow loss $\mathcal{L}^{(h^*, f^*, f_{gt})}$ and input x=(q,C), the gradient of DEQ flow is given by $$\frac{\partial \mathcal{L}}{\partial \theta} = \frac{\partial \mathcal{L}}{\partial z^*}\left(I - \frac{\partial f_\theta}{\partial z^*}\right)^{-1} \frac{\partial f_\theta(z^*, x)}{\partial \theta} \quad (5)$$

Importantly, this theorem enables decoupling the forward and backward passes of a DEQ flow estimator; (i.e., to perform gradient update, one only needs the final output z*, and do not need to perform backpropagation-through-time (BPTT)). This means a huge memory reduction: whereas an L-step recurrent flow estimator takes O(L) memory to perform BPTT, a DEQ estimator reduces this overhead by a factor of L to be O(1) (e.g., RAFT uses L=12 to train the model, so using a DEQ flow can theoretically reduce the iterative refinement memory cost by 12×).

To summarize, a DEQ flow's forward pass directly solves a fixed-point flow-update equation via black-box solvers; and its backward pass relies only on the final optimum z*, which make this flow estimation process much more akin to the optimization-based perspective.

Accelerating DEQ Flows: Formulating optical flow estimation as a deep equilibrium solution also enables fully exploitation of the toolkit from implicit deep learning, which cannot be justified in prior methods based on RNNs. Elaborated below on examples is how this equilibrium formulation can substantially help improve the forward and backward pipeline and significantly simplify the overall overhead of modern flow estimators.

Inexact Gradients for Training DEQs. Despite the niceness of the implicit function theorem (IFT), inverting the Jacobian term could quickly become intractable to manage with high-dimensional feature maps. To overcome this, exploiting fast vector-Jacobian products and iteratively solving a linear fixed-point system $$g^\top = g^\top \frac{\partial f_\theta}{\partial z^*} + \frac{\partial \mathcal{L}}{\partial z^*}$$

is employed. However, this approach is still iterative in nature, and in practice it is no cheaper than the forward flow solving process.

These implicit networks' backward dynamics suggest that they can typically be trained, and even benefit from, simple and inexact approximations of the IFT, while still modeling an "infinite-depth" representation through the fixed-point forward pass. That is, the exact solution to Eq. (1) to train these networks is not needed. Instead use $$\frac{\partial \mathcal{L}}{\partial \theta} \approx \widetilde{\frac{\partial \mathcal{L}}{\partial \theta}} = \frac{\partial \mathcal{L}}{\partial z^*} A \frac{\partial f_\theta(z^*, x)}{\partial \theta} \quad (6)$$

where A is a Jacobian (inverse) approximation term. Alternatively use A=I (i.e., Jacobian-free), which simplifies the backward pass of a DEQ flow estimator to a single step computation $$\frac{\hat{\partial} \mathcal{L}}{\partial \theta} \approx \frac{\partial \mathcal{L}}{\partial z^*} \frac{\partial \tilde{f}_\theta(z^*, x)}{\partial \theta},$$

Therefore, unlike the BPTT-based recurrent framework used by existing flow estimators, a DEQ flow estimator's backward pass that uses inexact gradient consists of a single step (and thus is almost free)! Empirically, by almost eliminating the backward pass cost, the inexact gradients significantly reduce the total training time for DEQ flow estimator further by a factor of almost 2×. Note that the capability of using inexact gradients is a direct and unique consequence of the fixed-point formulation, and assumes a certain level of stability for the underlying dynamics. Our empirical experience suggest that DEQ flows are generally stable. An additional approach that further improves the stability of these estimates is discussed next.

Sparse fixed-point correction of DEQ flows. A longstanding challenge in training implicit networks is the growing instability problem. In short, since DEQ optical flow estimators have no discrete layers (or steps), they struggle to converge during training. In other words, the stable flow estimate z*=(h*,f*) could become computationally expensive to reach. This suggests that the optical flow estimation process gets slower.

In this work, one embodiment is sparsely applying a fixed-point correction term to stabilize the DEQ flow convergence. Formally, suppose the black-box solver (e.g., Broyden's method) yields a convergence path $(z^{[0]}, \ldots, z^{[i]}, \ldots z^*)$, where $z^{[0]}$ is the initial guess and z* is the final flow estimate. Then randomly pick $z^{[i]}=(h^{[i]}, f^{[i]})$ on this path (e.g., can be uniformly spaced), and define our total loss to be $$\mathcal{L}_{total} = \mathcal{L}_{main} + \mathcal{L}_{cor} = \underbrace{\|f^* - f_{gt}\|_2^2}_{main\ loss} + \gamma \underbrace{\|f^{[i]} - f_{gt}\|_2^2}_{fixed-point\ correction} \quad (7)$$

where γ<1 is a loss weight hyperparameter. This was inspired by the dense step-wise deep supervision used by conventional flow estimators like RAFT; however, this application differs in two significant ways. First, this is applied in an extremely sparse manner, with our primary goal being correcting instability. Second, unlike in RAFT, which performs costly BPTT through the RNN chain, this fixed-point correction loss is still path-independent and can be understood as a coarse-grained fixed-point estimate. Therefore, inexact gradient updates on this correction loss can be performed as well; i.e., $$\frac{\partial \mathcal{L}_{cor}}{\partial \theta} \approx \gamma \frac{\partial \mathcal{L}_{cor}}{\partial z^{[i]}} \frac{\partial f_\theta(z^{[i]}, x)}{\partial \theta}. \qquad (8)$$

Empirically, this significantly stabilizes the DEQ flow estimator while having no noticeable negative impact on performance. This result is in sharp contrast to existing stabilization methods like Jacobian regularization which 1) apply only locally to z*; and 2) usually hurt model accuracy. Moreover, due to the inexact gradient in Eq. (8), this method adds almost no extra computation or memory cost.

While the scope may be limited to flow estimation here, this approach suggests a potentially valuable and lightweight solution to the generic instability issue of implicit models.

Fixed-point reuse for better initialization: The DEQ flow estimator's unique formulation also inherits many useful properties from the general optimization framework. One of these nice properties is the ability to perform fixed-point reuse to further accelerate flow estimation convergence. The motivation for this comes from the fact that consecutive frames of a video are typically highly-correlated. For instance, perhaps only a few objects are moving in the foreground, while most of the other content and background are nearly identical across these adjacent frames. More formally, if $p^i$, $p^{i+1}$, and $p^{i+2}$ are 3 consecutive video frames, then the ground-truth optical flow $f_i$ (between $p^i$ and $p^{i+1}$) is usually highly correlated to the next ground-truth optical flow $f^{i+1}$. Thus, when a real-time flow estimation with conventional networks is performed like FlowNet and RAFT, a lot of redundant computations are frequently performed. In contrast, with a DEQ flow, this can re-use the fixed-point solution $z^*_i$ of the previous frame, which estimates $f_i$, as the initial guess $z_{i+1}^{[0]}$ for the subsequent frame's fixed-point solver. Intuitively, these DEQ flows are able to automatically adjust their forward optimization by exploiting this more informed initial guess, which facilitates convergence speed. This amortizes the cost of flow estimation over long video sequences, since only frame 0 requires full fixed-point solving while the remaining frames can all recycle their predecessor's flow. Note that such reuse is related to, but still different from the warm-up scheme of RAFT, which only applies to f, excludes h, and still has to be unrolled for many steps. Because a DEQ flow directly models a fixed point, such an adaptive computational by exploiting the inductive bias of video data is well-justified.

Figure 3A:
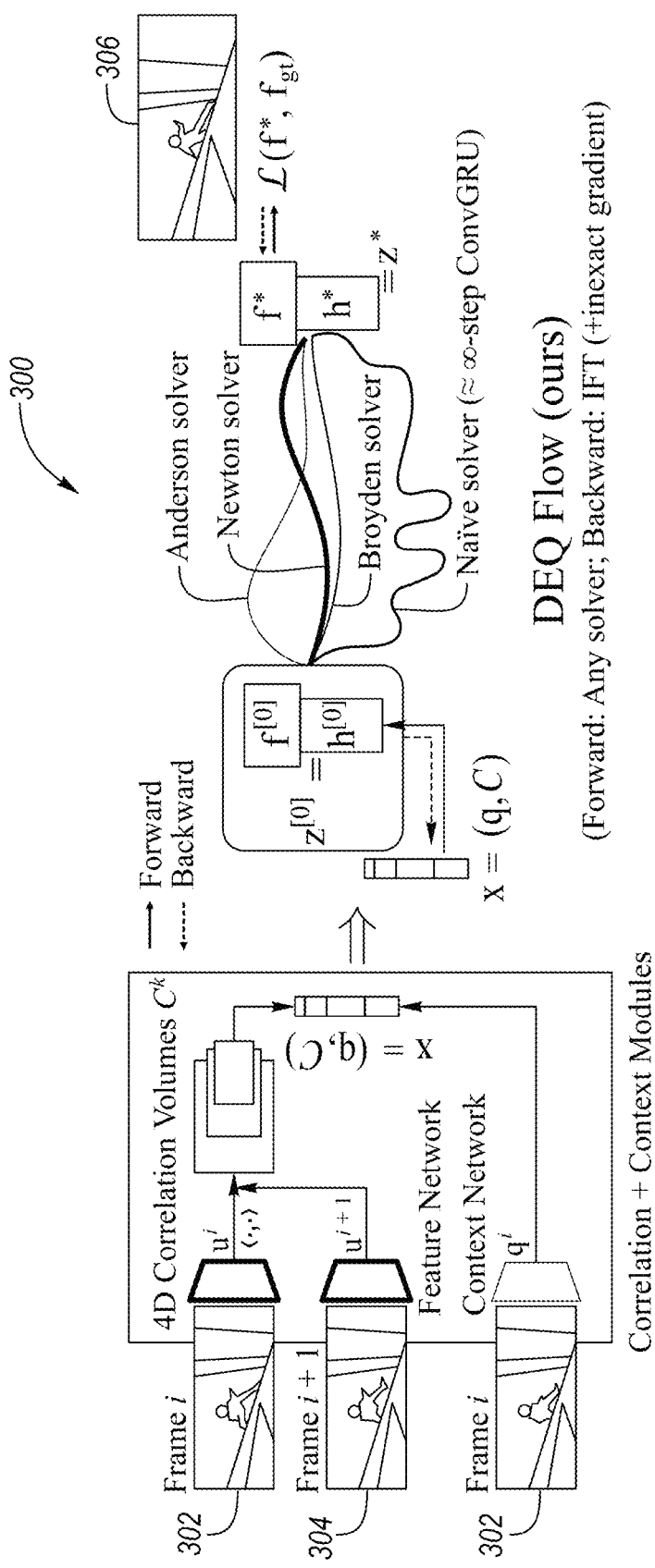
FIG. 3A is a graphical flow diagram for a fix point solution via a root finding method in a machine learning system such as a Deep Equilibrium Model (DEQ), according to an embodiment.

FIG. 3A shows the practicality of fixed-point reuse on Sintel video sequences. By reusing the fixed point, one can further accelerate the DEQ flow estimator's inference speed by a factor of about 1.6×. Interestingly, while RAFT's iterative unrolling aims to mimic the iterative convergence, its activations usually oscillate at a relatively high level after about 15 update iterations.

To summarize, while a conventional recurrent flow estimator like RAFT needs to be unrolled for some finite L steps and back-propagated through the same L-step chain, a deep equilibrium flow estimator: 1) leverages the IFT and requires only O(1) training memory, 2) uses inexact gradients to reduce the backward pass to O(1) computation, and 3) can take advantage of correlation between adjacent frames to amortize the flow estimation cost across a long sequence, thus significantly accelerating the forward pass cost.

The results of experiments are discussed in this section. Specifically, highlights of the computational and memory efficiency of DEQ flow estimators and analysis of how the fixed-point correction improves the DEQ flow. This method achieves state-of-the-art zero-shot performance on both the MPI Sintel dataset and the KITTI 2015 dataset, with an astonishing 12.9% error reduction in the F1-all score and 6.6% improvement in EPE for KITTI-15 (while still using a similar compute budget to RAFT).

A quantitative evaluation is presented in Table 1. By first pretraining the DEQ flow model on the FlyingChairs and FlyingThings3D datasets. Then test the model on the training set of MPI Sintel and KITTI 2015 datasets. This model is denoted "C+T"; it evaluates the zero-shot generalization of the DEQ flow model. Then, fine-tune the DEQ flow estimator on MPI-Sintel, KITTI 2015, and HD1K for the test submission.

The models trained were the exactly the same size as RAFT (5.3 M) and GMA (5.9 M) except they use DEQ flow formulation instead of recurrent updates. They are denoted as DEQ-RAFT-B and DEQ-GMA-B, respectively. Exploiting the memory efficiency of the DEQ flow model, much larger models fit into the same compute budget of two 11 GB 2080Ti GPUs. To this end, it allowed trained DEQ-RAFT-L (8.4 M) and DEQRAFT-H (12.8 M) by increasing the width of hidden layers inside the update operator. Also trained DEQRAFT-D (9.4 M) by duplicating the ConvGRU within $f_\theta$. As shown in FIG. 4B, even the largest DEQ-RAFT-H model only consumes less than half of the flow estimation memory used by a standard-sized RAFT model, while achieving significantly better accuracy (4.38 AEPE and 14.9 F1-all score on KITTI-15, see Table. 1).

TABLE 1

Evaluation on Sintel and KITTI 2015 datasets. We report the Average End Point Error (AEPE) and the F1-all measure for the KITTI dataset (lower is better). "C + T" refers to results that are pre-trained on the Chairs and Things datasets. "S + K + H" refers to methods that are fine-tuned on the Sintel, KITTI, and HD1K datasets. The bold font stands for the best result and the underlined results ranks 2nd.

| | | Sintel (train) | | KITTI-15 (train) | | Sintel (test) | | KITTI-15 (test) |
|---|---|---|---|---|---|---|---|---|
| Data | Method | Clean | Final | AEPE | F1-all(%) | Clean | Final | F1-all(%) |
| C + T | LiteFlowNet[26] | 2.48 | 4.04 | 10.39 | 28.5 | — | — | — |
| | PWC-Net[44] | 2.55 | 3.93 | 10.35 | 33.7 | — | — | — |

TABLE 1-continued

Evaluation on Sintel and KITTI 2015 datasets. We report the Average End Point Error (AEPE) and the F1-all measure for the KITTI dataset (lower is better). "C + T" refers to results that are pre-trained on the Chairs and Things datasets. "S + K + H" refers to methods that are fine-tuned on the Sintel, KITTI, and HD1K datasets. The bold font stands for the best result and the underlined results ranks 2nd.

| Data | Method | Sintel (train) Clean | Sintel (train) Final | KITTI-15 (train) AEPE | KITTI-15 (train) F1-all(%) | Sintel (test) Clean | Sintel (test) Final | KITTI-15 (test) F1-all(%) |
|---|---|---|---|---|---|---|---|---|
| | LiteFlowNet2[27] | 2.24 | 3.78 | 8.97 | 25.9 | — | — | — |
| | VCN[53] | 2.21 | 3.68 | 8.36 | 25.1 | — | — | — |
| | MaskFlowNet[55] | 2.25 | 3.61 | — | 23.1 | — | — | — |
| | FlowNet2[29] | 2.02 | 3.54 | 10.08 | 30.0 | 3.96 | 6.02 | — |
| | RAFT[47] | 1.43 | 2.71 | 5.04 | 17.4 | — | — | — |
| | DEQ-RAFT-B | 1.48 | 2.77 | 5.01 | 16.3 | — | — | — |
| | DEQ-RAFT-L | 1.40 | 2.65 | 4.76 | 16.1 | — | — | — |
| | DEQ-RAFT-D | 1.39 | 2.67 | 4.41 | 15.4 | — | — | — |
| | DEQ-RAFT-H | 1.41 | 2.75 | 4.38 | 14.9 | — | — | — |
| | GMA[30] | 1.30 | 2.74 | 4.69 | 17.1 | — | — | — |
| | DEQ-GMA-B | 1.35 | 2.90 | 4.84 | 16.2 | — | — | — |
| | DEQ-GMA-L | 1.33 | 2.71 | 4.72 | 16.4 | — | — | — |
| C + T + | LiteFlowNet2[27] | (1.30) | (1.62) | (1.47) | (4.8) | 3.48 | 4.69 | 7.74 |
| S + K + | PWC-Net + [45] | (1.71) | (2.34) | (1.50) | (5.3) | 3.45 | 4.60 | 7.72 |
| H | VCN [53] | (1.66) | (2.24) | (1.16) | (4.1) | 2.81 | 4.40 | 6.30 |
| | MaskFlowNet[55] | — | — | — | — | 2.52 | 4.17 | 6.10 |
| | RAFT[47] | (0.76) | (1.22) | (0.63) | (1.5) | 1.94 | 3.18 | 5.10 |
| | DEQ-RAFT | (0.70) | (1.21) | (0.61) | (1.4) | 1.82 | 3.23 | 4.98 |

It was further verified that the aforementioned computational and memory benefits of the DEQ flow model on the Sintel (clean) dataset with a RAFT-based update operator (see Eq. (4)) trained on FlyingChairs and FlyingThings3D. The results are shown in FIG. 4B. Specifically, when training the DEQ flow estimator on Sintel with a batch size of 3 per GPU (the maximum that RAFT can fit with a 11 GB GPU), it was observed that the memory cost of the flow estimation process reduces by a factor of over 4×(red bars). Note that since the rest of the model was kept intact (e.g., correlation pyramid and context extraction), the DEQ flow estimator does not improve those parts of the memory burden, which now becomes the new dominant source of memory overhead. In addition, when the model is used for inference, the use of 32 recurrent steps for RAFT (with warm-start), and the Anderson solver for DEQ-RAFT (with reuse), which stops if relative residual falls below $\varepsilon=10^{-3}$. The results suggest that the DEQ flow converges to an accurate solution, and it is in practice about 20% faster than the RAFT models with the same structure and size (blue bars). Finally, it is shown that exploitation of such speed and memory savings can be used to build even larger and more accurate flow estimators (DEQRAFT-Huge), while still staying well within the compute and memory budget.

Stabilizing DEQ by Fixed-Point Correction. As mentioned above, unregularized canonical DEQ models (as well as other implicit networks like Neural ODEs) typically suffer from a growing instability issue typically symptomized by an increasingly costly forward fixed-point solving process. Performing an ablative experiment to study how our proposed sparse fixed-point correction scheme could help alleviate this issue. To understand the scheme's effect, train a DEQ flow model using both an Anderson and a Broyden solver with 36 and 24 forward iterations, respectively. For simplicity, equally divide the solver convergence trajectory into r+1 segments (where r is the frequency in FIGS. 4C-4F) and impose a correction loss after each trajectory clip. And, apply the one-step inexact gradient to the correction loss.

The results of DEQ flow models trained with 3 different settings: 1) a DEQ flow trained by IFT directly without an auxiliary correction loss; 2) a DEQ flow trained by inexact gradient without an auxiliary correction loss; and 3) DEQ flows trained by inexact gradient as well as 1-3 fixed-point correction terms. The results are reported in terms of AEPE (which measures performance) and absolute fixed-point residual error $\|f_\theta(z^*;x)-z^*\|_2$ (which measures stability). As shown in FIGS. 4C-4F, the proposed fixed-point correction significantly outperforms the standard IFT training protocol by about 9%, and reduces the fixed-point error by a conspicuous margin, e.g., over 60%. Moreover, this significant improvement in stability quickly diminishes as >1 corrections are applied; therefore in practice, one correction term is usually used. Together with the inexact gradient, the total training time can be streamlined over 45%, while the backward pass of a DEQ flow is still almost free.

Correlation between Performance and Convergence. A potential question is whether better fixed-point convergence can lead to better performance. To tackle this, evaluate the DEQ flow model trained using the standard "C+T" training protocol on the KITTI-15 training dataset. Visualize the per-frame EPE and the convergence measured by the absolute fixed point error and dye the scatter plot with the average norm of per-pixel flow across the frame, which can be understood as an indicator of hardness due to the large displacements. The Pearson correlation coefficient between the fixed-point error and EPE is over 0.86 supporting the claim that convergence is strongly correlated with the flow performance.

This application introduced a new framework for modeling optical flow estimation. A deep equilibrium (DEQ) flow directly models and solves a fixed-point stable flow estimate and offers a set of tools that make these flow models' training and inference process highly efficient (e.g., they enjoy an almost-free backward pass). Moreover, the use of such equilibrium formulation is largely orthogonal to, and thus complements, the prior modeling- and data-related efforts. Empirically it was shown that it is possible to integrate the DEQ flow estimator with these model designs (like RAFT) and achieve better performance on realistic optical flow datasets.

This implicit framework provides a strong (drop-in) replacement for existing recurrent, unrolled update operators used by most cutting-edge flow estimators. The DEQ flows are both more performant and lightweight—both computationally and memory-wise. Suggesting an exciting direction for building more efficient, large-scale and accurate optical flow models in the future.

Reference is now made to the embodiments illustrated in the Figures, which can apply these teachings to a machine learning model or neural network. FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
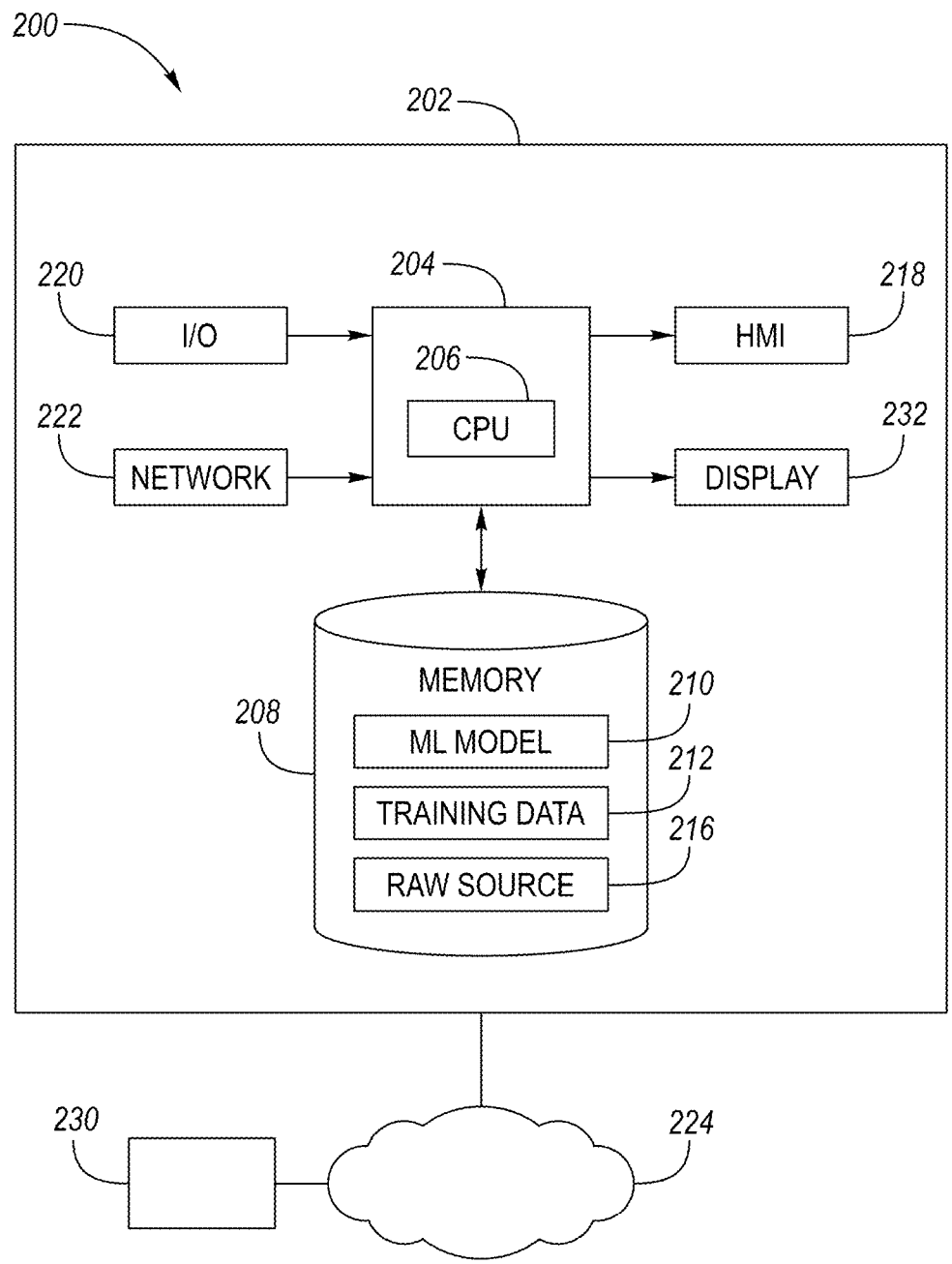
FIG. 2 illustrates a computer-implemented method for training and utilizing a neural network, according to an embodiment.

FIG. 2 depicts one embodiment of a system 200 to implement the DEQ models and associated solvers described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (JIMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm that is designed to perform a predetermined function. For example, the neural network algorithm may be configured in automotive applications to identify pedestrians in video images. The machine-learning algorithm 210 may also be a deep equilibrium (DEQ) model.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a pedestrian in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., pedestrian). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

Given the above description of the flow estimator in deep equilibrium models (DEQs), along with the structural examples of FIGS. 1-2 configured to carry out the estimator, the following algorithms are summarized in (I—Flow Estimation), (II—DEQ—Flow Estimator training), (III—Loss Computation) below. These algorithms can be carried out using the structure described in FIGS. 1-2, for example a processor and associated memory and input/output interface utilized in a neural network setting.

I—Flow Estimation:
Given:
Frozen (trained) layer function $f_\theta$
Video frames $\{p^0, \ldots p^t, \ldots, p^T\}$, $0 \leq t \leq T$
For each pair of video frames $p^t$, $p^{t+1}$
1 Initialization:
Initialize fixed-point solution $z_t^{[0]} = [h_t^{[0]}, f_t^{[0]}]$
    If t=0, use any suitable fixed initialization (e.g., initialize to 0)
    If t>0, use fixed point solution for the previous solution $z_t^{[0]} = z^*_{t-1}$
2 Optical flow estimation:
Compute fixed point solution with black-box solver $$z_t^{[0]} \to z^*_t = [h^*_t, f^*_t] = f_\theta(h^*_t, f^*_t)$$

3 Return optical flow estimate: $f^*_t$
II—DEQ—Flow Estimator Training:
Given:
Layer function $f_\theta$
Video frames $\{p^0, \ldots, p^t, \ldots, p^T\}$, $0 \leq t \leq T$ and ground-truth optical flows $f^*$=
(Optional) Correction/regularization loss hyperparameters For each pair of video frames $p^t$, $p^{t+1}$ and ground truth optical flow $f_{gt}^t$

1 Optical flow estimation:
Estimate optical flow (see OPTICAL FLOW ESTIMATION), obtaining:

$$f = \{f^0, \ldots, f^T\}$$

2 Loss computation:
Compute loss between estimated optical flows f and ground truth optical flows $f_{gt}$ $$\mathcal{L}_{main}(f, f_{gt})$$

2.5 (OPTIONAL) Correction/regularization loss comp.
Compute additional correction/regularization losses $$\mathcal{L}_{cor}(f, f_{gt})$$

3 Parameter update:
Update layer function parameters θ based on loss gradients using Implicit Function Theorem (IFT)
Repeat #1-#3 until loss stabilizes. The stopping criteria may include a fixed number of iterations, (e.g., do 1-3 50 times) or until convergence of loss.

III—Loss Computation:
1 Main loss:
Any suitable and differentiable loss may be used. For example:

$$\mathcal{L}_{main} = \frac{1}{T}\sum_t \|f^t - f_{gt}^t\|_2^2$$

2 Correction/regularization losses (example):

$$\mathcal{L}_{cor} = \frac{1}{T}\sum_t \|f_{[i]}^t - f_{gt}^t\|_2^2$$

A deep equilibrium (DEQ) flow estimator directly models the flow as a path-independent fixed-point solving process. This application presents an implicit framework to replace the existing recurrent approach to flow estimation including optical flow estimation. The DEQ flows converge faster, require less training memory, are often more accurate, and are compatible with prior model designs (e.g., RAFT and GMA).

FIG. 3A is a graphical flow diagram 300 for a fix point solution via a root finding method in a machine learning system such as a Deep Equilibrium Model (DEQ), according to an embodiment. A first image frame 302 and a second image frame 304 are used to generate a flow estimation 306. This visual comparison of the DEQ flow estimator. After the correlation and context modules, a DEQ flow uses a fast, black-box fixed-point solver (e.g., Anderson, Newton) to directly solve for a stable (fixed-point) flow z*=(h*,f*), and differentiate through z* with a cheap inexact gradient. This makes a DEQ flow's backward pass almost free. In contrast, a recurrent flow estimator has to be unrolled for many steps, and needs to perform BPTT, which is costly in both computation and memory.

Figure 3B:
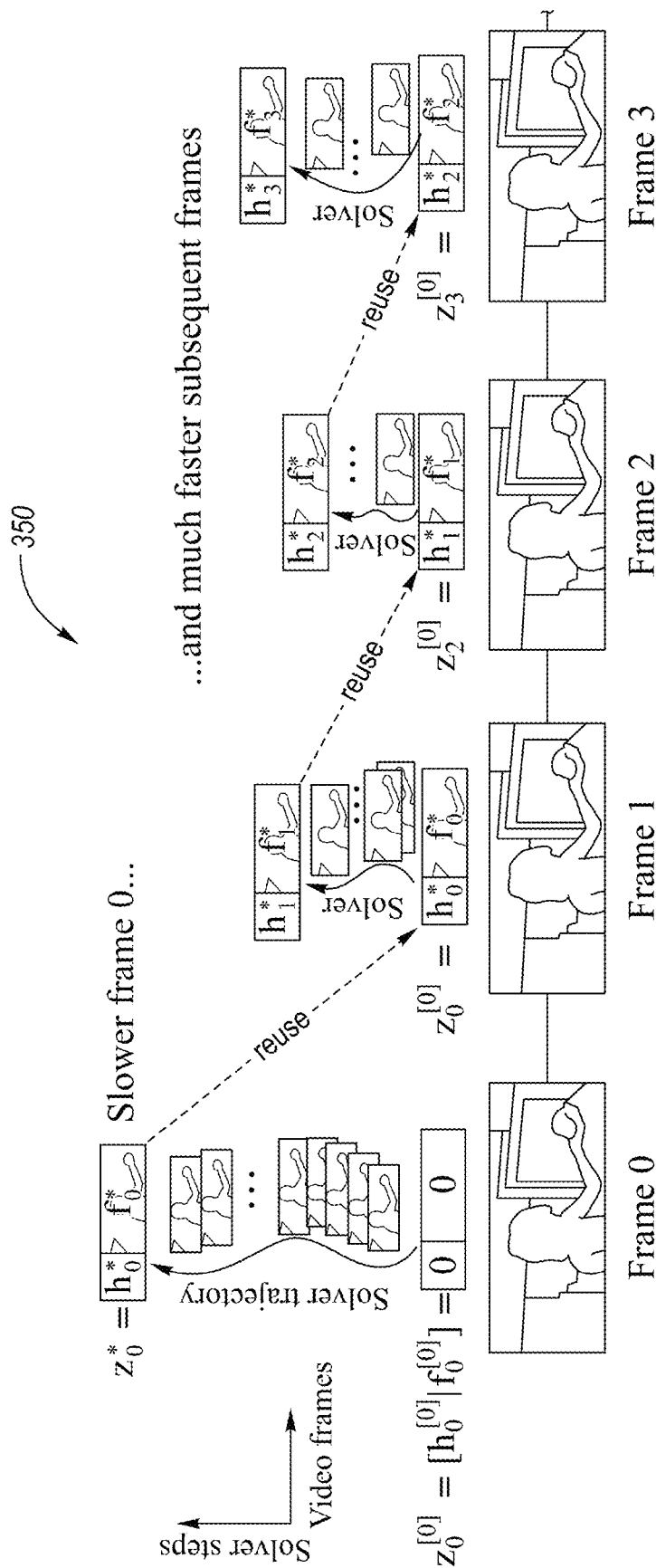
FIG. 3B is another graphical flow diagram for a fix point solution via a root finding method in a machine learning system such as a Deep Equilibrium Model (DEQ), according to an embodiment

FIG. 3B is another graphical flow diagram 350 for a fix point solution via a root finding method in a machine learning system such as a Deep Equilibrium Model (DEQ), according to an embodiment. By reusing fixed-point z* from the previous frame's flow estimation, this system can "jump start" the subsequent equilibrium solving, essentially amortizing the solver cost and speeding up convergence.

Figure 4A:
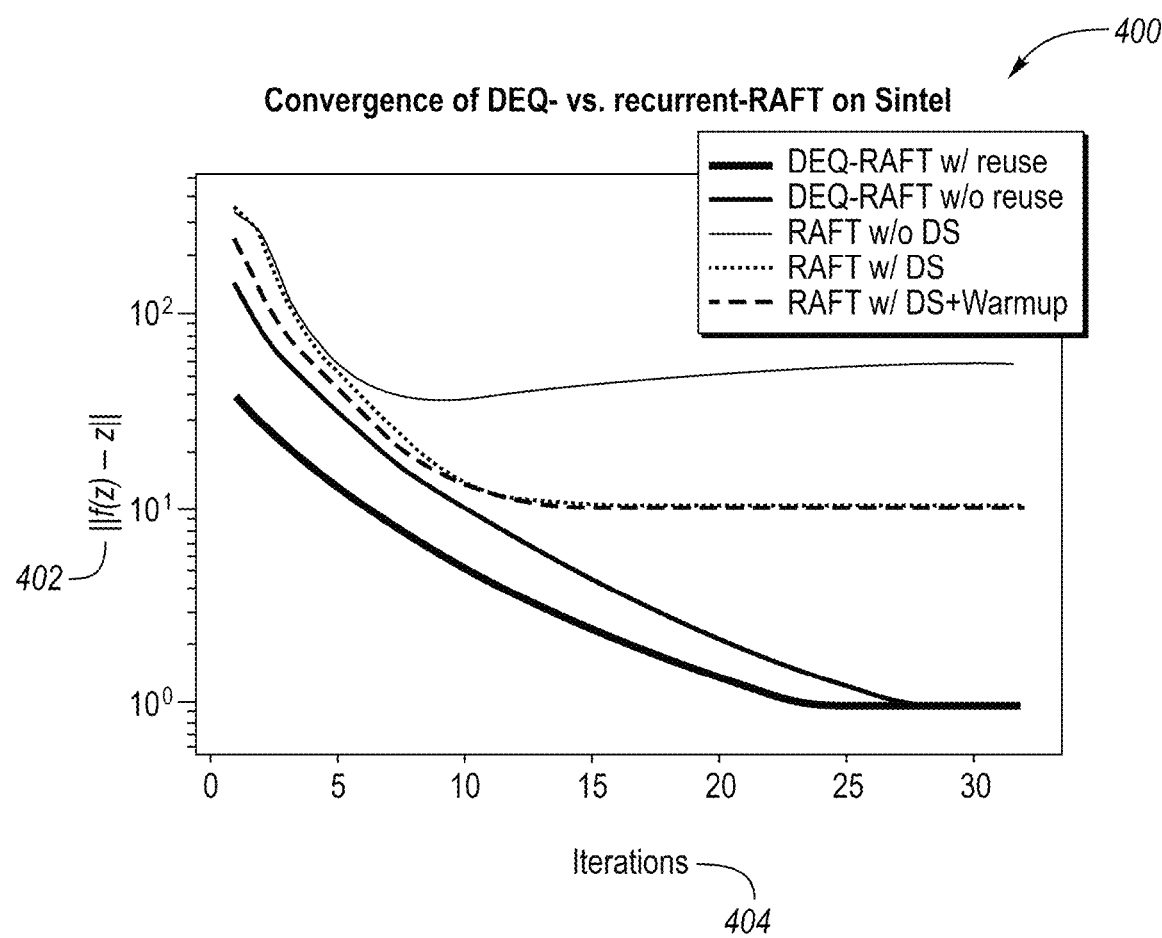
FIG. 4A is a graphical representation of a comparison of forward convergence of DEQ and recurrent flow estimators on 50 frames of Sintel video with respect to iterations.
Figure 4B:
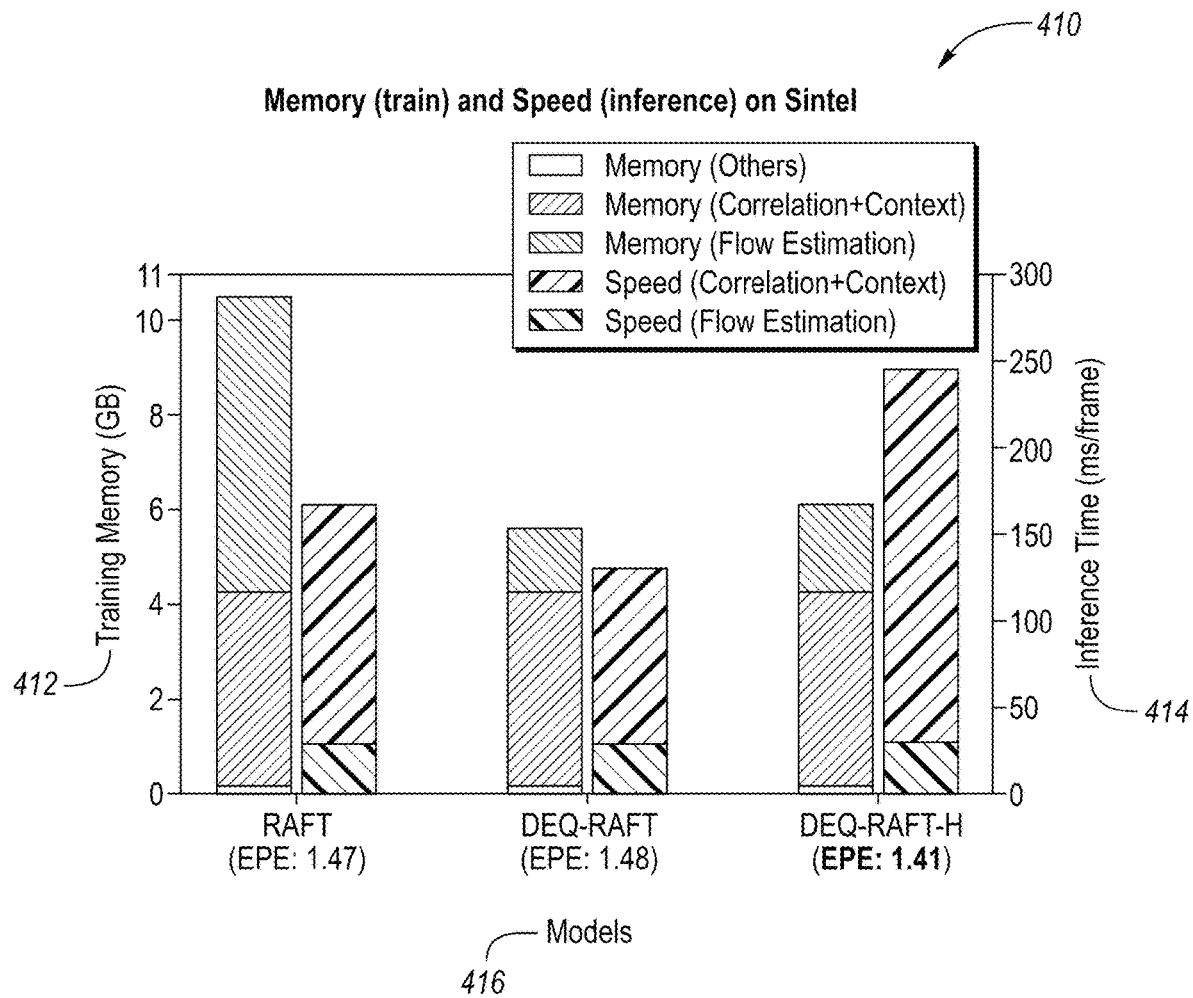
FIG. 4B is a graphical representation of training memory and inference time with respect to different models.

FIG. 4A is a graphical representation 400 of a comparison of forward convergence 402 of DEQ and recurrent flow estimators on 50 frames of Sintel video with respect to iterations 404. "DS" stands for deep supervision used by RAFT. DEQ flow with fixed-point reuse converges faster than DEQ flow without reuse.

FIG. 4B is a graphical representation 410 of training memory 412 and inference time 414 with respect to different models 416. Comparing the training memory, inference speed and performance on Sintel (clean) with image size 436×1024. The same model design (based on RAFT) consumes much less memory and computes much quicker than the recurrent counterpart. All results were benchmarked on a single Quadro RTX 8000 GPU.

Performance and convergence stability (measured by absolute residual error) of the DEQ flow. Frequency indicates how many correction terms were picked, with 0 meaning no correction. DEQ flows trained with this proposed correction enjoy superior performance and stability.

Figures 4C, 4D:
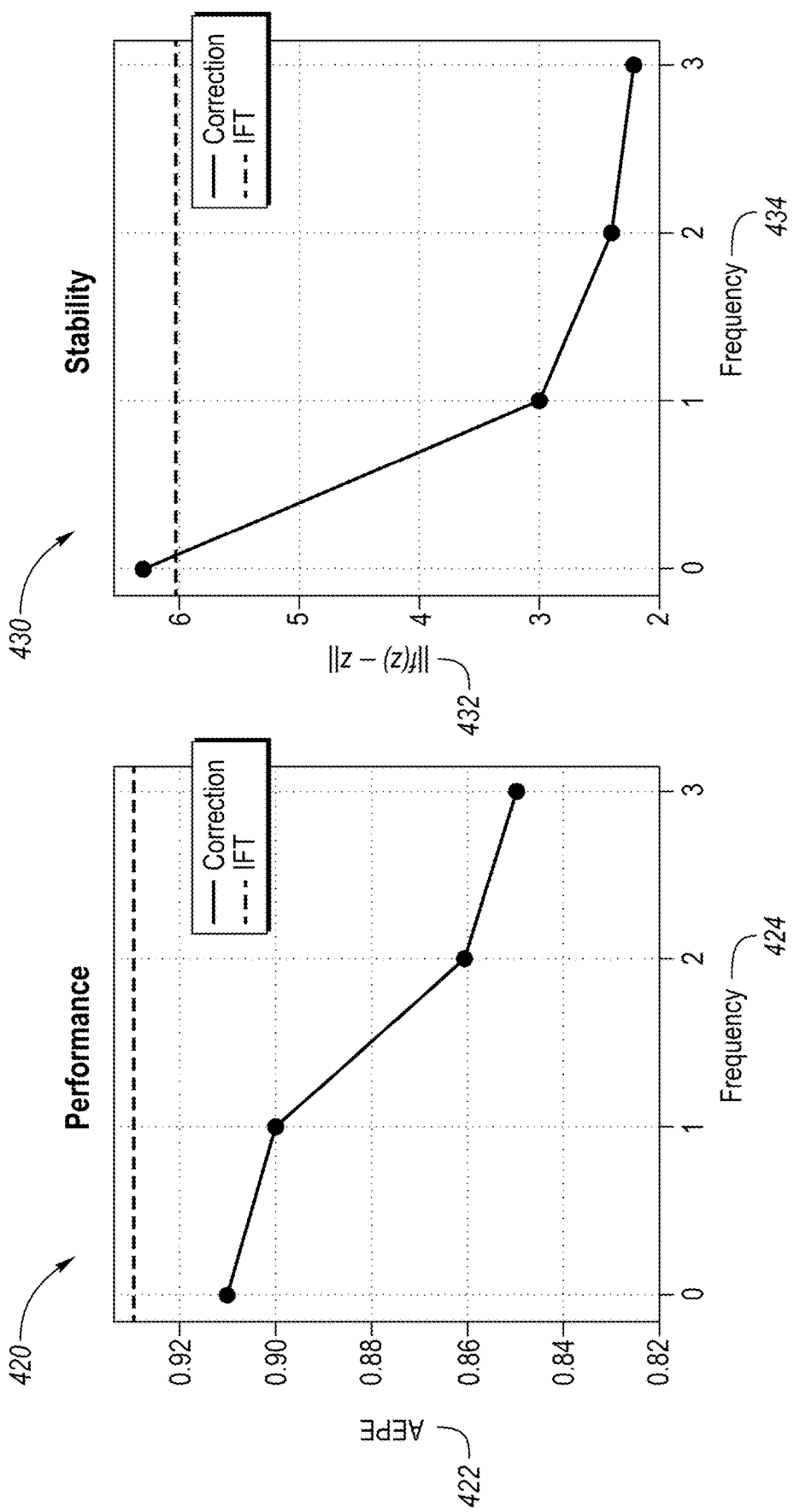
FIGS. 4C-4D are graphical representation of average end point error (AEPE) and convergence stability with respect to frequency for a training DEQ using an Anderson solver.

FIGS. 4C-4D are graphical representation 420, 430 of average end point error (AEPE) 422 and convergence stability 432 with respect to frequency 424, 434 for a training DEQ using an Anderson solver.

Figures 4E, 4F:
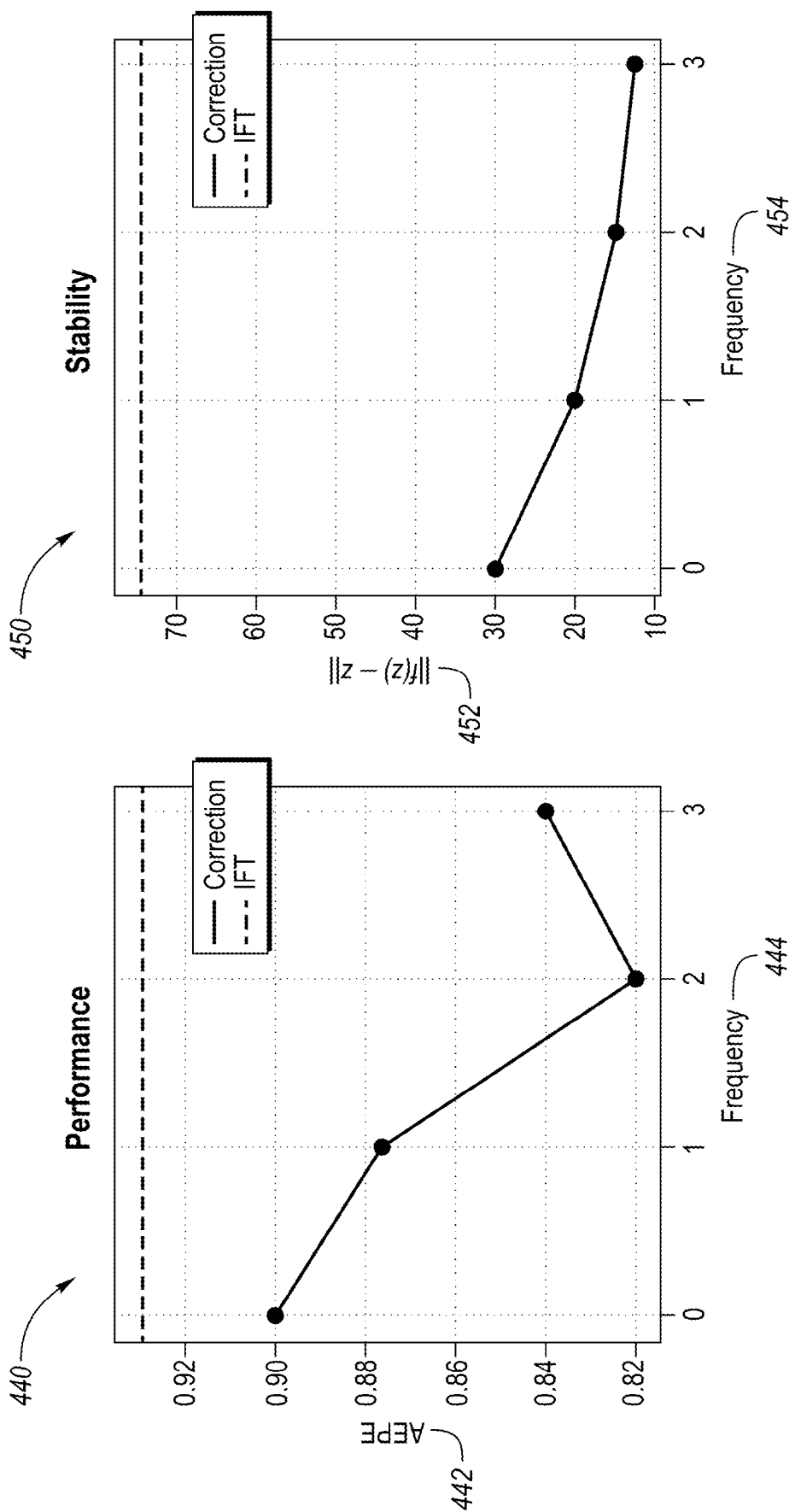
FIGS. 4E-4F are graphical representation of average end point error (AEPE) and convergence stability with respect to frequency for a training DEQ using a Broyden solver.

FIGS. 4E-4F are graphical representation 440, 450 of average end point error (AEPE) 442 and convergence stability 452 with respect to frequency 444, 454 for a training DEQ using a Broyden solver.

Performance and convergence stability (measured by absolute residual error) of the DEQ flow. Frequency indicates how many correction terms were picked, with 0 meaning no correction. DEQ flows trained with this proposed correction enjoy superior performance and stability.

Considering correlation between convergence and performance, it was also observed that harder examples (e.g., those with large motion) typically lead to more challenging fixed-point convergence.

Figure 5:
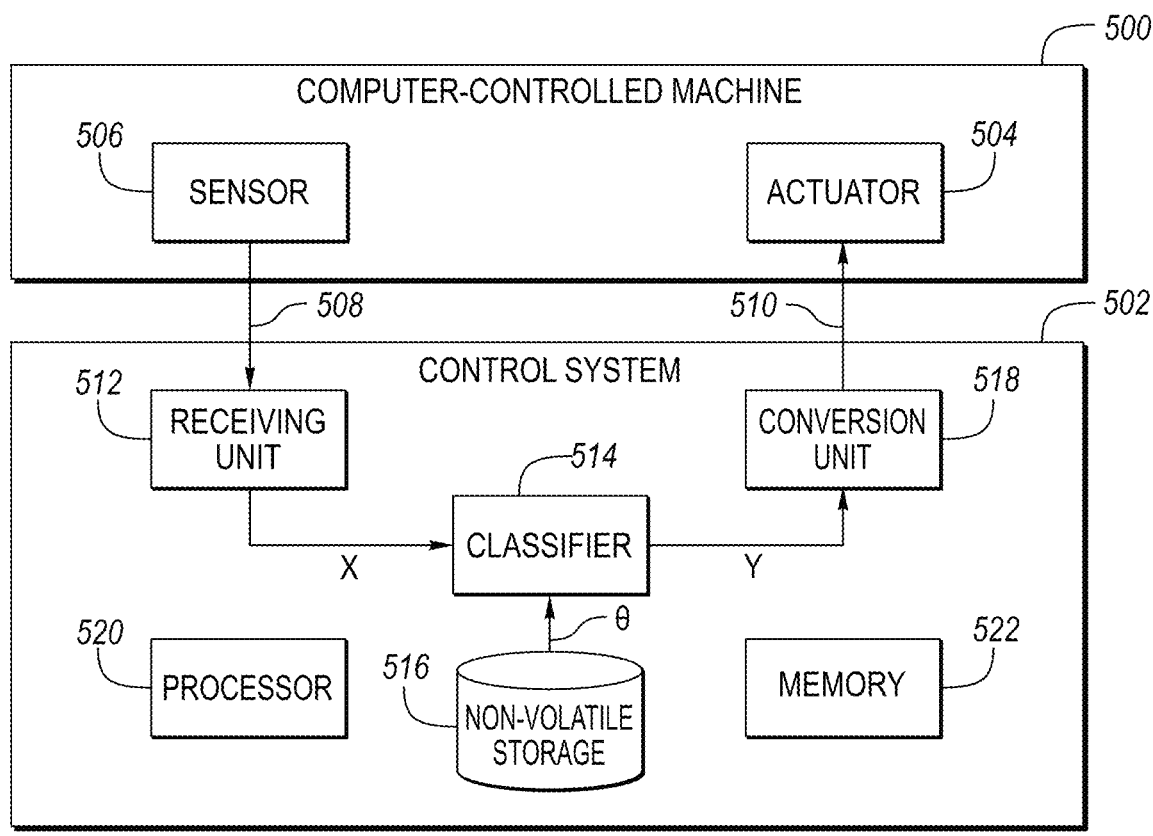
FIG. 5 depicts a schematic diagram of an interaction between a computer-controlled machine and a control system, according to an embodiment.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
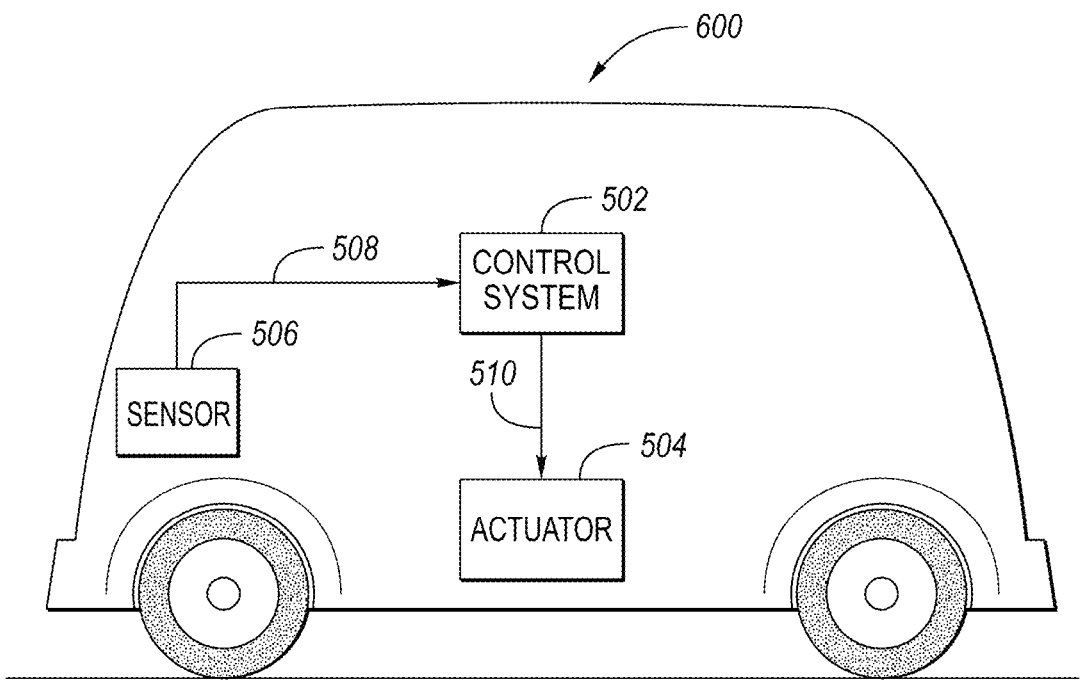
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
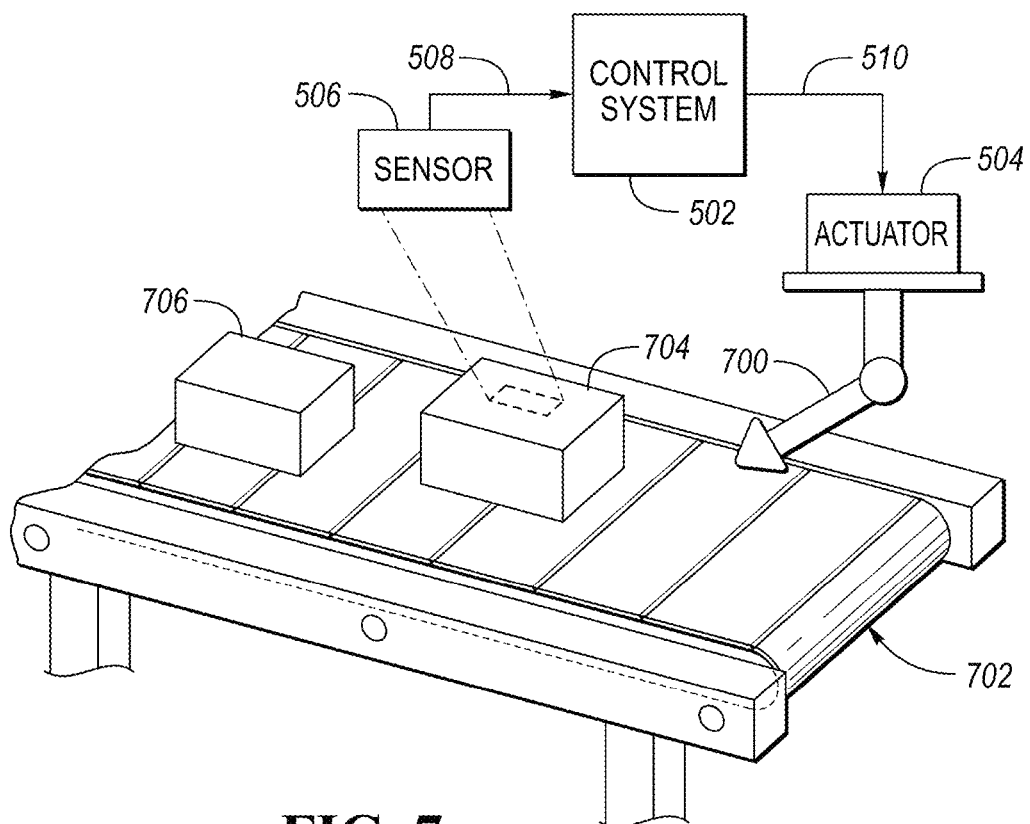
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
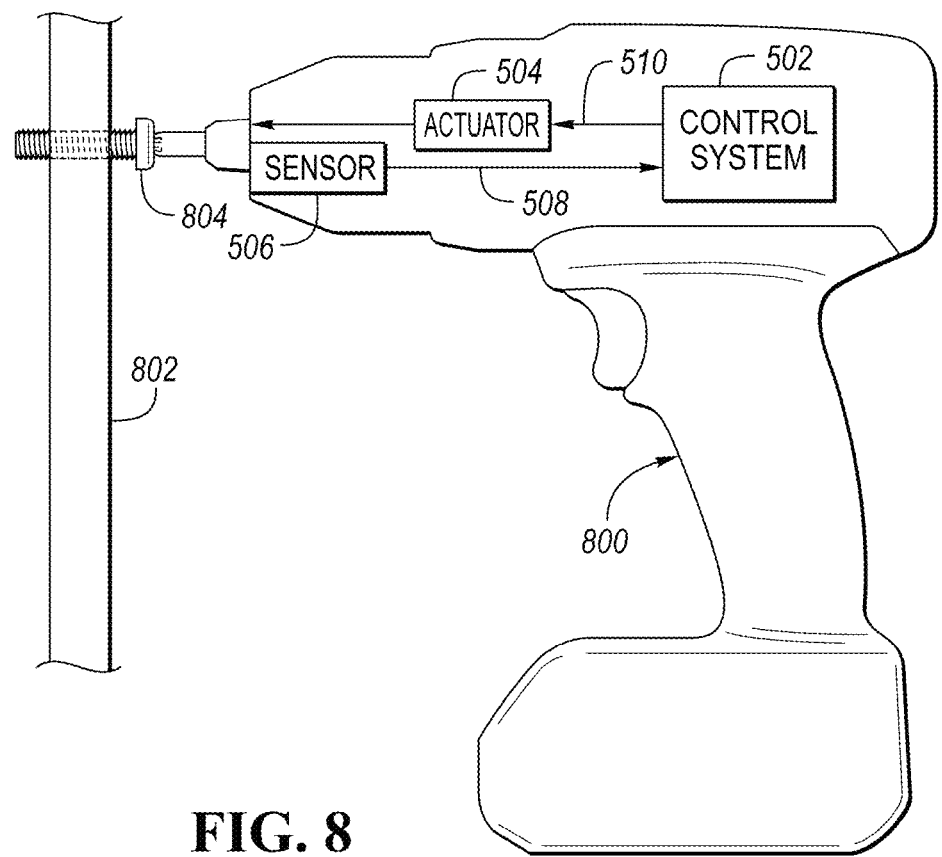
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
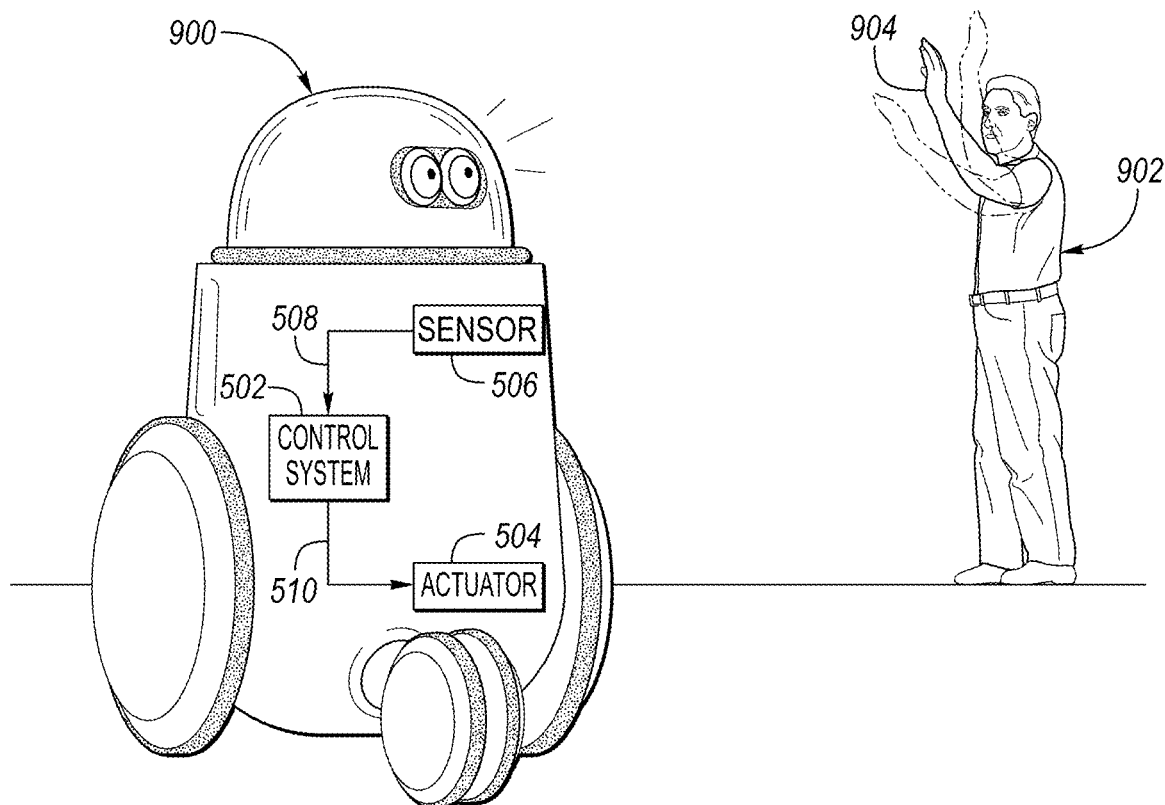
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
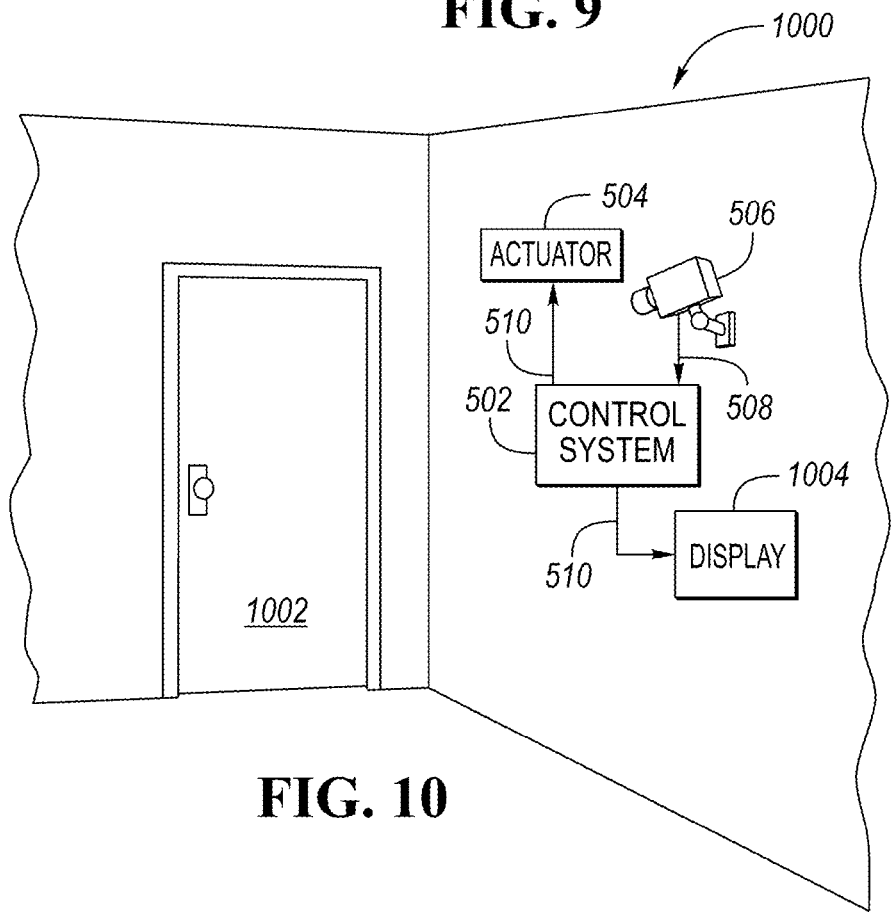
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
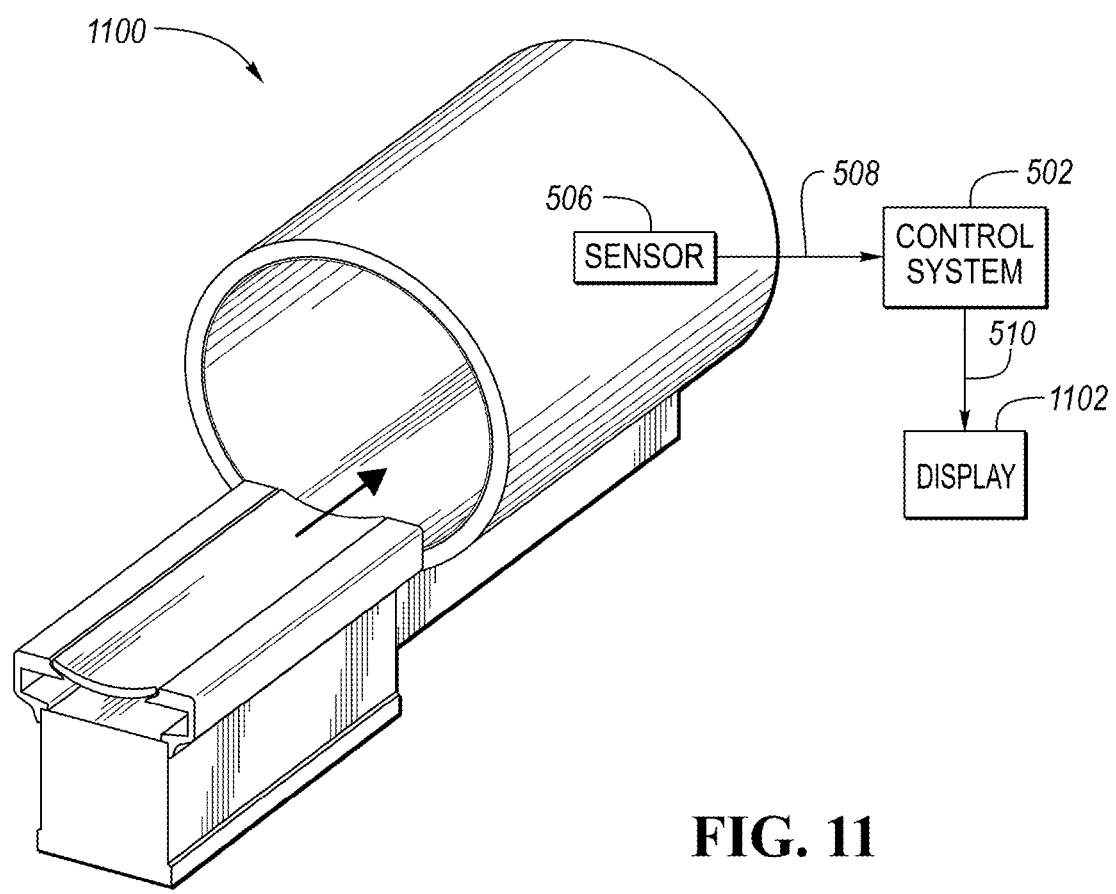
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 302 to display the imaging and highlighting the potentially anomalous region.

References herein are made to convergence. The system may determine that convergence is met based on a threshold or another attribute. For example, the threshold utilized for convergence may be met by a defined number of iterations, an amount of error loss, the amount of classification error, loss value (e.g., average or sum), or other attributes.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for a machine learning (ML) system comprising:
   receiving a first image frame and a second image frame from a sensor, wherein the first image frame and the second image frame are time series data;
   determining a first flow state and a first latent state of the first image frame;
   determining a Deep Equilibrium Model (DEQ) based fixed-point solution via a root finding method based on the first flow state, the first latent state, and a layer function to obtain an estimated flow state (f) and an estimated latent state (h), the fixed-point solution (z*) represented by the following equation:

$$z^* = (h^*, f),$$

where h* is a fixed-point flow state and f* is a fixed-point latent state;
   receiving a third image frame, wherein the second image frame and the third image frame are time series data;
   determining the DEQ based fix-fixed-point solution via the root finding method based on the estimated flow state, the estimated latent state, and the layer function to obtain an updated flow state and updated latent state, the layer function is updated based on a total loss ($\mathcal{L}_{total}$) comprised of a main loss ($\mathcal{L}_{main}$) and a correction loss ($\mathcal{L}_{cor}$) and represented by the following equation:

$$\mathcal{L}_{total} = \mathcal{L}_{main} + \mathcal{L}_{cor} = \underbrace{\|f^* - f_{gt}\|_2^2}_{\text{main loss}} + \gamma \underbrace{\|f^{[i]} - f_{gt}\|_2^2}_{\text{fixed-point correction}}$$

where $f_{gt}$ is a ground truth optical flow, $\gamma$ is less than one and is a loss weight hyperparameter, and $f[^{i}]$ is part of randomly picked $z^{[i]} = (h^{[i]}, f^{[i]})$ on a convergence path $(z^{[0]}, \ldots, z^{[i]}, \ldots z^*)$, where $z^{[0]}$ is an initial guess; and
   outputting the updated flow state.

2. The method of claim 1, wherein the fixed-point solution is expressed by:

$$(h^*, f^*) = z^* = f_\Theta(z^*, x) = f_\Theta((h^*, f^*), x)$$

in which $$x = \text{Conv2d}([q, f^*, \mathcal{C}(f^* + c^0)])$$

$$h^* = \text{ConvGRU}(h^*, [x, q])$$

$$f^* = f^* + \text{Conv2d}(h^*),$$

and $f_\Theta$ is the layer function.

3. The method of claim 1, further comprising estimating motion of objects relative to the ML system and controlling an actuator of the ML system based on the updated flow state, wherein the ML system is a semi-autonomous vehicle or an autonomous vehicle.

4. The method of claim 1, further comprising estimating motion of objects relative to the ML system, and controlling an actuator of the ML system based on the updated flow state, wherein the ML system is a security system.

5. The method of claim 1, wherein the root finding method is a Quasi-newton method.

6. The method of claim 5, wherein quasi-newton method is an Anderson solver, or a Broyden solver.

7. The method of claim 1, wherein the sensor is a video camera, an infrared camera, LIDAR sensor, ultrasonic sensor, or an acoustic array.

8. The method of claim 1, wherein the layer function is trained with a plurality of image frames and associated flow data processed via the DEQ based fixed-point solution to obtain training flow state and training latent state data.

9. A device control system comprising:
a controller configured to,
receive a first image frame and a second image frame from a sensor, wherein the first image frame and the second image frame are time series data;
determine a first flow state and a first latent state of the first image frame; and
determine a fixed-point solution via a root finding method based on the first flow state, the first latent state, and a layer function to obtain an estimated flow state (f) and an estimated latent state (h), the fixed-point solution (z*) represented by the following equation:

$$z^* = (h^*, f^*),$$

where h* is a fixed-point flow state and f* is a fixed-point latent state;
receive a third image frame, wherein the second and third image frames are time series data;
determine the DEQ based fixed-point solution based on the estimated flow state, the estimated latent state, and layer function to obtain an updated flow state and updated latent state, the layer function is updated based on a total loss ($\mathcal{L}_{total}$) comprised of a main loss ($\mathcal{L}_{main}$) and a correction loss ($\mathcal{L}_{cor}$) and represented by the following equation:

$$\mathcal{L}_{total} = \mathcal{L}_{main} + \mathcal{L}_{cor} = \underbrace{\|f^* - f_{gt}\|_2^2}_{\text{main loss}} + \gamma \underbrace{\|f^{[i]} - f_{gt}\|_2^2}_{\text{fixed-point correction}}$$

where $f_{gt}$ is a ground truth optical flow, $\gamma$ is less than one and is a loss weight hyperparameter, and $f^{[i]}$ is part of randomly picked $z^{[i]} = (h^{[i]}, f^{[i]})$ on a convergence path $(z^{[0]}, \ldots, z^{[i]}, \ldots z^*)$, where $z^{[0]}$ is an initial guess; and
control the system based on the updated flow state.

10. The system of claim 9, wherein the fixed-point solution is a Deep Equilibrium Model (DEQ) based fix point solution that is expressed by:

$$(h^*, f^*) = z^* = f_\Theta(z^*, x) = f_\Theta((h^*, f^*), x)$$

in which $$x = \text{Conv2d}([q, f^*, \mathcal{C}(f^* + c^0)])$$

$$h^* = \text{ConvGRU}(h^*, [x, q])$$

$$f^* = f^* + \text{Conv2d}(h^*),$$

and $f_\Theta$ is the layer function.

11. The system of claim 10, wherein the root finding method is a Quasi-newton method.

12. The system of claim 11, wherein the sensor is a video camera, an infrared camera, LIDAR sensor, ultrasonic sensor, or an acoustic array.

13. The system of claim 12, wherein the layer function is trained with a plurality of image frames and associated flow data processed via the DEQ based fixed-point solution to obtain training flow state and training latent state data.

14. A system for performing at least one perception task associated with control of a machine, the system comprising:
a processor; and
a memory including instructions that, when executed by the processor, cause the processor to:
receive a first image frame and a second image frame from a sensor, wherein the first image frame and the second image frame are time series data;
determine a first flow state and a first latent state of the first image frame;
determine a Deep Equilibrium Model (DEQ) based fixed-point solution via a root finding method based on the first flow state, the first latent state, and a layer function to obtain an estimated flow state (f) and an estimated latent state (h), the fixed-point solution (z*) represented by the following equation:

$$z^* = (h^*, f),$$

where h* is a fixed-point flow state and f* is a fixed-point latent state;
receive a third image frame, wherein the second and third image frames are time series data;
determine a first flow state and a first latent state of the first image frame;
determine a Deep Equilibrium Model (DEQ) based fixed-point solution via a root finding method based on the first flow state, the first latent state, and a layer function to obtain an estimated flow state (f) and an estimated latent state (h), the fixed-point solution (z*) represented by the following equation:

$$z^* = (h^*, f^*),$$

where h* is a fixed-point flow state and f* is a fixed-point latent state;
receive a third image frame, wherein the second and third image frames are time series data;
determine the DEQ based fixed-point solution based on the estimated flow state, the estimated latent state, and the layer function to obtain an updated flow state and updated latent state, the layer function is updated based on a total loss ($\mathcal{L}_{total}$) comprised of a main loss ($\mathcal{L}_{main}$) and a correction loss ($\mathcal{L}_{cor}$) and represented by the following equation:

$$\mathcal{L}_{total} = \mathcal{L}_{main} + \mathcal{L}_{cor} = \underbrace{\|f^* - f_{gt}\|_2^2}_{\text{main loss}} + \gamma \underbrace{\|f^{[i]} - f_{gt}\|_2^2}_{\text{fixed-point correction}}$$

where $f_{gt}$ is a ground truth optical flow, $\gamma$ is less than one and is a loss weight hyperparameter, and $f^{[i]}$ is part of randomly picked $z^{[i]}=(h^{[i]}, f^{[i]})$ on a convergence path $(z^{[0]}, \ldots, z^{[i]}, \ldots z^*)$, where $z^{[0]}$ is an initial guess; and output the updated flow state.

15. The system of claim 14, wherein the fixed-point solution is expressed by:

$$(h^*, f^*) = z^* = f_\theta(z^*, x) = f_\theta((h^*, f^*), x)$$

in which $$x = \text{Conv2d}([q, f^*, \mathcal{C}(f^* + c^0)])$$

$$h^* = \text{ConvGRU}(h^*, [x, q])$$

$$f^* = f^* + \text{Conv2d}(h^*),$$

and $f_\theta$ is the layer function.

16. The system of claim 14, further comprising instructions that when executed by the processor, cause the processor to perform operations including estimate motion of objects relative to the machine and control an actuator of the machine based on the updated flow state.

17. The system of claim 16, wherein the machine is a semi-autonomous vehicle or an autonomous vehicle, a security system, an access control system, a medical system or a robotic system.

18. The system of claim 17, wherein the sensor is a video camera, an infrared camera, LIDAR sensor, ultrasonic sensor, or an acoustic array.

19. The system of claim 14, further comprising instructions that when executed by the one or more computing devices, cause the one or more computing device to perform operations including train the layer function with a plurality of image frames and associated flow data processed via the DEQ based fixed-point solution to obtain training flow state and training latent state data.

\* \* \* \* \*